L. R. MALLING ET AL 2,944,212

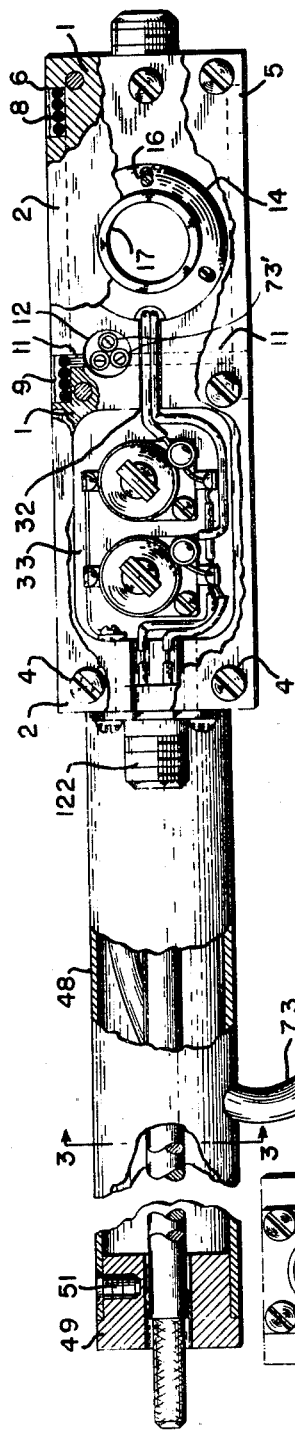
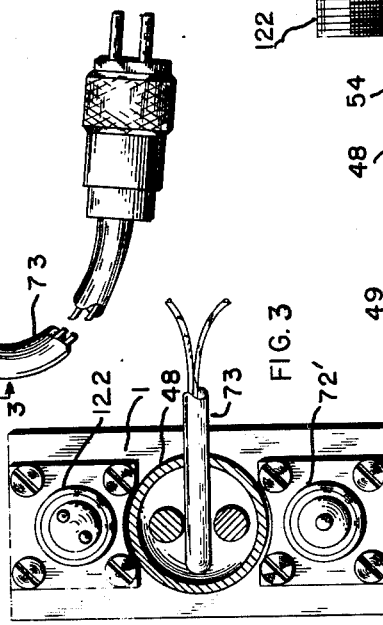
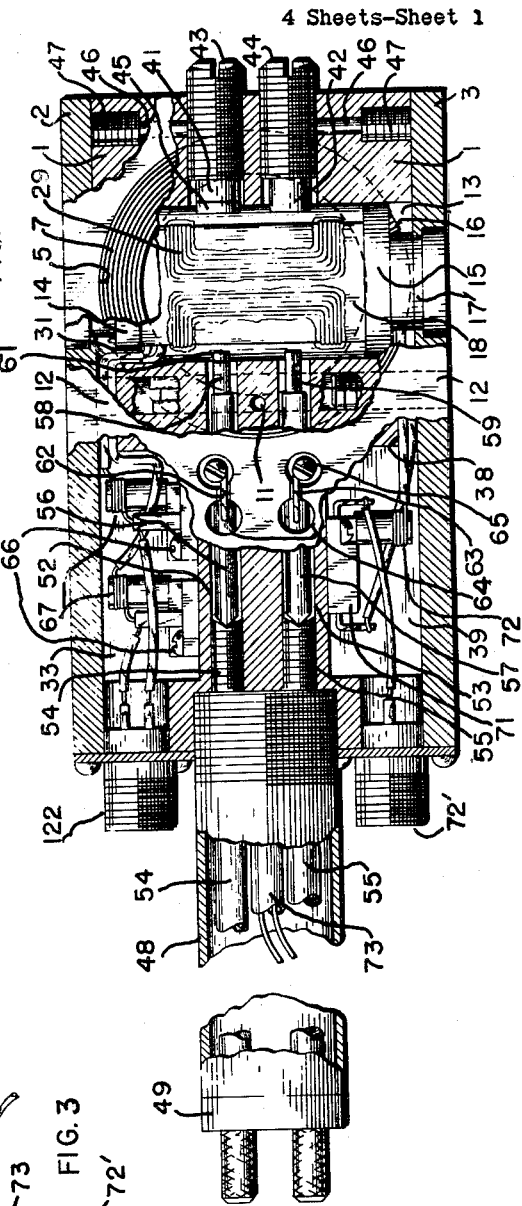

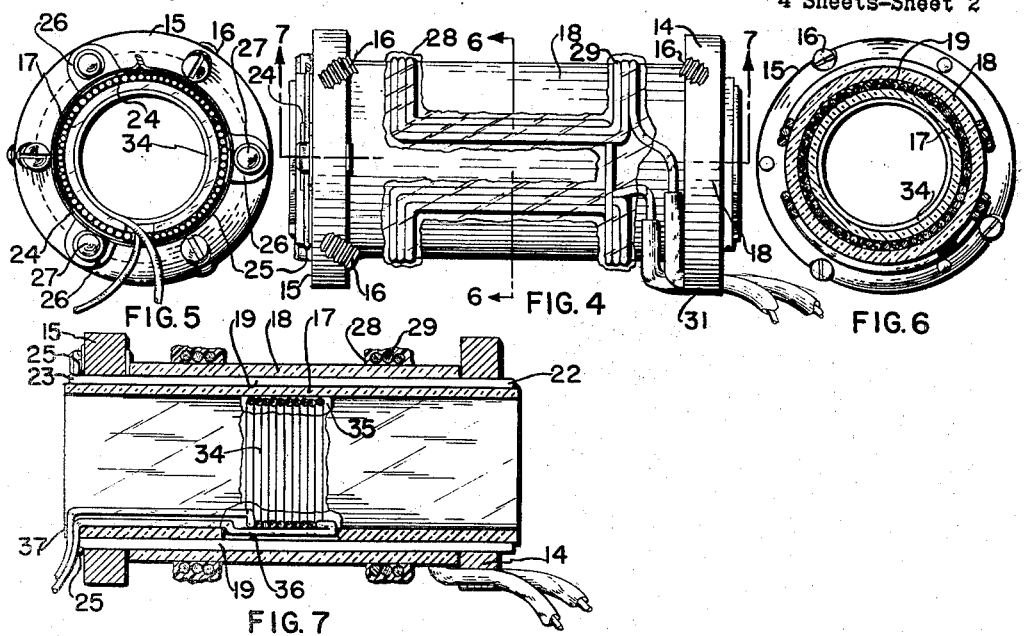
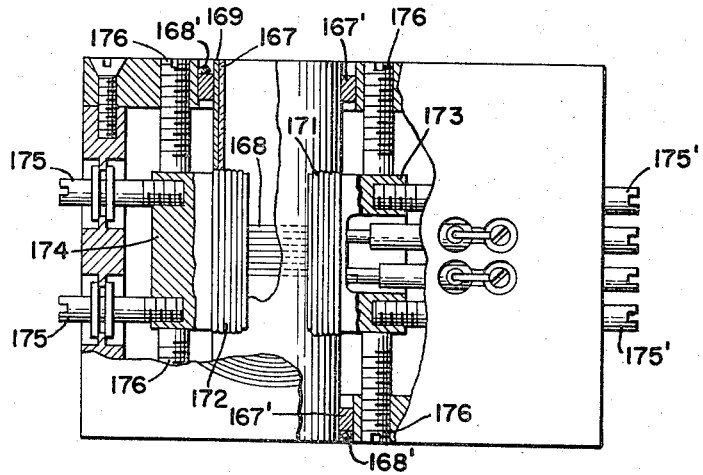
FIG. 14
INVENTORS
LEONARD R. MALLING
DOLAN L. MANSIR
FORREST A. NELSON &
MARTIN E. PACKARD
BY Paul B. Hunter,
ATTORNEY July 5, 1960

GYROMAGNETIC RESONANCE APPARATUS

Filed July 6, 1953

INVENTORS
LEONARD R. MALLING
DOLAN L. MANSIR
FORREST A. NELSON &
MARTIN E. PACKARD

BY Paul B. Hunter

ATTORNEY

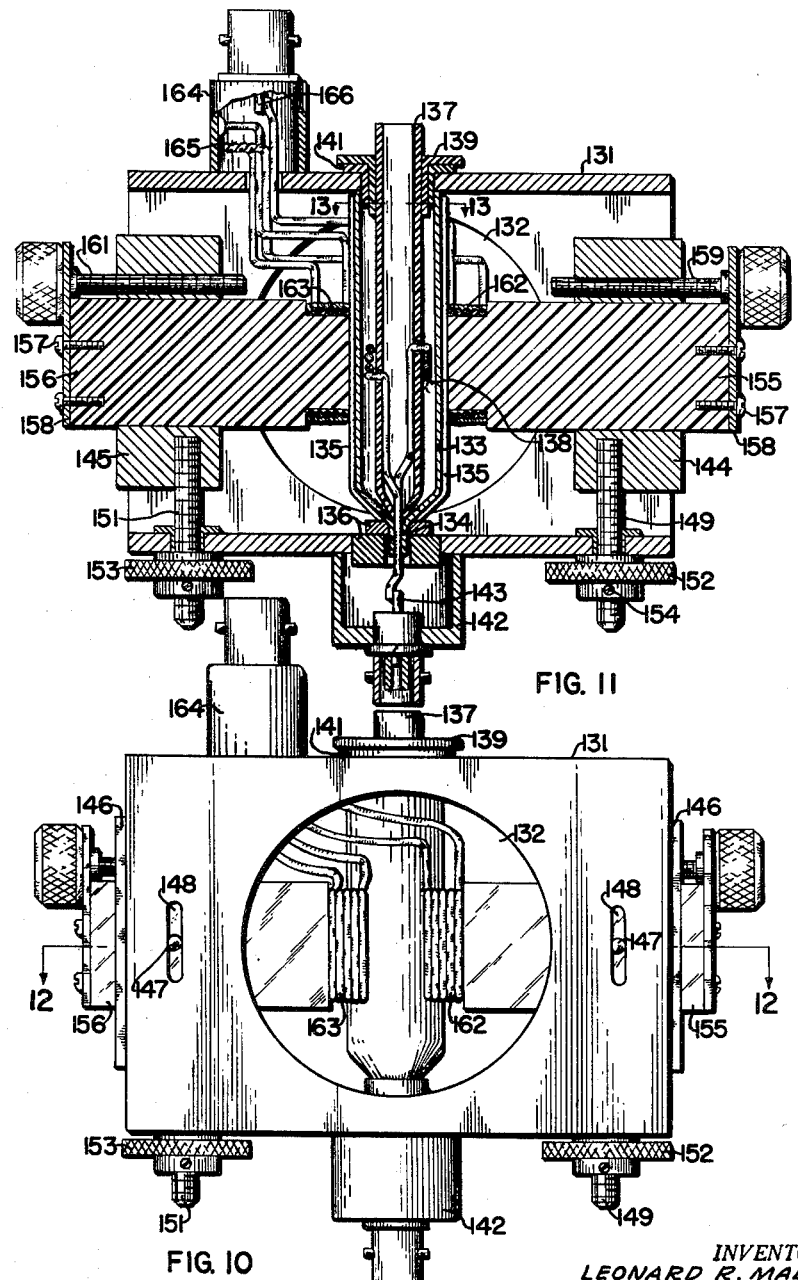

United States Patent Office 2,944,212
Patented July 5, 1960

2,944,212
GYROMAGNETIC RESONANCE APPARATUS

Leonard R. Malling, Los Angeles, Dolan L. Mansir and Forrest A. Nelson, Palo Alto, and Martin E. Packard, Menlo Park, Calif., assignors to Varian Associates, San Carlos, Calif., a corporation of California Filed July 6, 1953, Ser. No. 366,156
20 Claims. (Cl. 324—.5)

This invention relates, generally, to novel apparatus for use in the field of gyromagnetic resonance and, more particularly, to novel probe structures for utilization in various gyromagnetic resonance applications such as, for example, chemical analysis by nuclear or electron resonance of constantly flowing liquids or solids.

Gyromagnetic resonance has many practical uses of which the measurement and exploration of magnetic fields and chemical analysis are two examples. There exists the need in the art for apparatus providing probe structures which are efficient and extremely rugged, yet small enough to fit in the gap between the pole faces of magnets producing fields up to the order of 30,000 gauss. Such probes must provide easy and rapid ingress and egress of the gyromagnetic substance to be acted upon and be capable of holding a fixed volume of substance or allowing the substance to continually flow therethrough. In the case of a probe structure for use in gyromagnetic induction work, an extremely sensitive yet simple system of balancing the inductive coupling between the transmitter and receiver coil must be included in the probe.

When utilizing gyromagnetic resonance in various systems where board coverage is provided, provision must be made for supplying radio frequency energy to the transmitter coil which is variable over a wide band of frequencies, for example, 2 to 16 megacycles, and which also is variable over a wide range of amplitudes. In the latter respect, certain embodiments require an applied radio frequency field which may be controllably varied over a range of from .5 to 5000 milligauss or more.

It is therefore one object of this invention to provide novel gyromagnetic apparatus providing probes for use in gyromagnetic resonance work which are compact, extremely rugged, more rapidly and efficiently balanced, and which provide easy and rapid ingress and egress of the gyromagnetic substance to be acted upon.

Another object of this invention is to provide a unitary probe body for use in gyromagnetic induction applications in which the transmitter coil, the receiver coil, and the sweep coils are compactly and securely mounted yet readily accessible and wherein the gyromagnetic substance to be acted upon may be quickly and easily inserted and removed or transmitted therethrough.

Another object of this invention is to provide novel probe structures for use in gyromagnetic induction work wherein the transmitter and receiver coils may be readily balanced to control the flux leakage therebetween.

These and other objects will become apparent from a perusal of the following specification taken in connection with the accompanying drawings wherein Fig. 1 is a side elevation partly in section of the novel probe structure of one particular embodiment of the invention in which the transmitter and receiver coils are securely affixed on a removable subassembly and in which novel means are provided for balancing the flux leakage between the two coils.

Fig. 2 is a plan view partly in section of the novel probe structure shown in Fig. 1.

Fig. 3 is a transverse sectional view of the probe taken along section line 3—3 in Fig. 2 looking in the direction of the arrows.

Fig. 4 is a side elevation view of a subassembly included in the novel probe structure of Fig. 1.

Fig. 5 is a side elevation view of the subassembly of Fig. 4.

Fig. 6 is a transverse sectional view of the subassembly shown in Fig. 4 along section line 6—6.

Fig. 7 is a longitudinal section view of the subassembly of Fig. 4.

Fig. 10 is a side elevation view of still another novel probe structure embodying this invention which includes novel means for balancing the transmitter and receiver coils.

Fig. 11 is a longitudinal section view of the novel probe structure shown in Fig. 10.

Fig. 14 is a side elevation view partly in section of still another novel probe structure embodying this invention which provides novel means for balancing the transmitter and receiver coils by causing relative movement of the coils.

Figure 9:
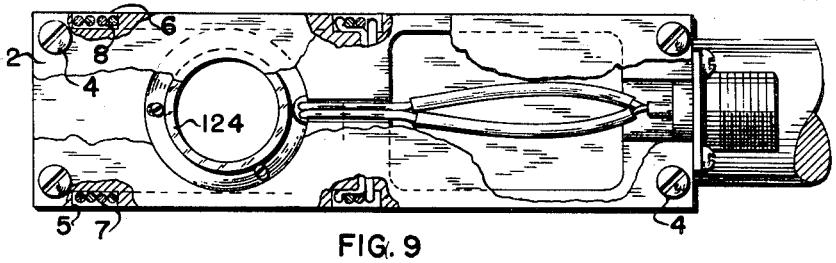
Fig. 9 is a plan view partly in section of the probe shown in Fig. 8.

The phenomenon of gyromagnetic resonance is extensively discussed and explained in United States Patent 2,561,489, issued to Felix Bloch and William W. Hansen on July 24, 1951, also in an article entitled "Nuclear Induction," written by Felix Bloch and appearing in Physical Review, vol. 70, page 460, and also in an article entitled "The Nuclear Induction Experiment," written by Bloch, Hansen and Packard, appearing in Physical Review, vol. 70, page 474.

The utilization of the gyromagnetic resonance phenomenon in certain cases requires that the gyromagnetic substance to be acted upon be polarized by a unidirectional magnetic field and that a radio frequency field be applied to the substance substantially at right angles to the unidirectional field. Taking nuclear resonance for illustration purposes, when the frequency of the applied radio frequency field is at resonance, that is, equal to the Larmor precession frequency of the nuclei in the polarizing field, an appreciable number of the nuclei will precess in phase. From investigations it is known that at resonance $\omega = \gamma H$, where $\omega$ is the angular rate of the applied R.F. field, $\gamma$ is the gyromagnetic ratio of the nuclei, and $H$ is the strength of the unidirectional magnetic field. Therefore, when measuring magnetic fields, a sample of matter is selected having nuclei with a known value of $\gamma$ and a controlled radio frequency field is applied to the sample in the unknown field to produce resonance. From the above relationships, the value $H$ of the unknown field may be determined. With chemical analysis, the values of $H$ and $\omega$ at resonance are known and the gyromagnetic ratio of the nuclei in the substance under investigation is determined and, since the gyromagnetic ratio is different and distinct for all known isotopes with a magnetic moment, the substance may be identified. In the nuclear induction method for utilizing nuclear resonance, the radio frequency field produced by the precessing nuclei will induce a voltage in a receiver coil positioned at right angles to the unidirectional magnetic field. At resonance, the induced voltage will be at a maximum.

In previous developments utilizing gyromagnetic resonance, various probes or heads have been used to fixedly position the transmitter coil and a sample of matter relative to each other within the polarizing field. In the nuclear induction methods, the receiver or pickup coil has also been included as a fixed element in the probe structure. In the latter type probes, a paddle device was used to reduce the inductive coupling between the transmitter and receiver coils. The present inventors have devised novel improved probe structures which are set out in detail below.

Referring now to Figs. 1 through 7, inclusive, the main body of the probe disclosed therein comprises a unitary rectangular block 1 of metal such as aluminum having a top plate or cover 2 and a bottom plate 3 secured thereto as by secrews 4. A pair of shallow annular recesses 5 and 6 are located diametrically opposite each other in the two larger sides of the block 1. A pair of sweep coils 7 and 8 are spirally wound in the recesses and securely retained therein by, for example, being embedded in a thermo-setting plastic 9. The two ends of each sweep coil extend through small holes 11 in the block 1 from the associated recesses 5 and 6 into a small bore 12 which extends through the block 1. The lower end of this bore 12 is threaded, the sweep coil ends extending into the unthreaded portion of this small bore. The threaded end of the bore 12 provides a convenient means for fixedly mounting the probe within a magnet gap. For example, the probe may be mounted on a threaded pedestal, the pedestal being movable in the horizontal and vertical directions to position the probe within the gap.

A large cylindrical bore 13 extends through the block 1 with its open ends in the two smaller sides of the block aligned with circular openings in the top and bottom plates 2 and 3 and with its axis intersecting an imaginary center line drawn through the center points of the annular recesses 5 and 6. Fixedly secured within this cylindrical bore 13 as by two metal, such as aluminum, mounting rings 14 and 15 and associated set screws 16 is a removable subassembly (Figs. 4, 5, 6 and 7) shown as comprising a pair of cylindrical tubes made of material having good dielectric characteristics, such as glass or plastic, one tube 17 being fitted within the other 18, the inner tube 17 being longer than the outer tube 18. Sandwiched between the inner tube 17 and the outer tube 18 are a plurality of small individual insulated shielding wires 19, such as enameled copper wires, which run longitudinally side-by-side between the two tubes. To maintain these wires in fixed position relative to each other and secured between the tubes, they are embedded in a thermo-plastic film or sheet. One end 22 of each of these wires is left unconnected while the opposite ends 23 of the wires have the enamel and plastic removed therefrom and are connected together by means of three thin contact bands of metal 24 such as copper and by an associated band of wire 25 encircling the end of the inner tube 17 in engagement with the ends of all the wires 19. The bands 24 have small tabs 26 protruding therefrom by means of which the bands are electrically connected to the mounting ring 15 as by small screws or rivets 27. Located on the outer surface of the outer tube 18 and fixedly secured thereon as by means of a thermo-setting plastic 28 is the two section transmitter coil 29, the two sections being wound in substantially rectangular configuration diametrically opposite to each other. The ends of this two section transmitter coil 29 are brought out from the cylindrical bore 13 through a small notch 31 in the mounting ring 14 and thence pass through a small channel 32 into a large rectangular recess 33 in the block 1. A receiver or pickup coil 34 is wound about the inside surface of the smaller diameter tube 17 and secured therein as by means of a thermo-setting plastic 35. The axis of this cylindrical receiver coil 34 coincides with the axis of the tubes 17 and 18 and is perpendicular to and intersects the axis of the two section transmitter coil 29. The ends of this receiver coil 34 are brought out from the tube 17 at one end thereof, one of these wires passing around the receiver coil through a small slit 36 in the tube 17. These wires then pass through a small notch 37 in the end of the tube 17 and through a small channel 38 into a second large rectangular recess 39 in the block 1. The tubes 17 and 18 and the mounting rings 14 and 15 may be secured together to form a rigid unitary structure as by means of a thermo-setting plastic. To facilitate mounting the receiver coil 34 within the inner tube 17, the tube may be split in half longitudinally and cemented together again after the receiver coil is properly positioned.

Two coarse-balancing members 41 and 42 are positioned closely adjacent the transmitter and receiver coils 29 and 34 by means of plastic screws 43 and 44 on which the members are fixedly mounted and corresponding threaded bores in the block 1 into which the screws extend. One of these members 41 comprises a plastic cylindrical block having a disk shaped electrically conductive element 45 as of copper mounted on the inner end thereof. The other of these members 42 consists of a cylindrical block of resistance material such as carbon. Set screws 47 and associated plastic rods 46 serve to lock these screws 43 and 44 in position after proper leakage adjustment which is subsequently described.

A hollow cylindrical support tube and end handle 48 is threaded into one end of the block 1, the other end of this support tube being closed by an end cap 49 mounted thereon as by means of screw 51. Extending through the end cap 49 and the hollow supporting tube 48 and threaded into two bores 52 and 53 in the end of the block 1 are two fine-balancing rods 54 and 55 of, for example, aluminum. These bores 52 and 53 extend longitudinally through the block 1 into the large bore 11 and hold a pair of metallic rods 56 and 57, respectively. Securely affixed on the ends of the rods so as to be closely adjacent the transmitter and receiver coils 29 and 34 are a pair of fine-balancing members 58 and 59. One of these members 58 comprises a plastic cylindrical block having a disk shaped electrically conductive element 61 as of copper mounted on the inner end thereof. The other of these members 59 consists of a small cylindrical block of resistance material such as carbon. A pair of L-shaped spring members 62 and 63 are fixedly secured at one end in holes in the corresponding metal rods 56 and 57 and extend up through small bores 64 in the side of the block 1, the other ends of these spring members being secured flush to the block 1 by screws 65. These two spring members 62 and 63 are tensioned so as to normally urge the rods 56 and 57 in the direction toward the support tube 48 against the ends of the tuning rods 54 and 55. The members 58 and 59 are moved closer to the transmitter and receiver coils by rotating the metal rods 54 and 55 which thus move inwardly against the tension of the springs 62 and 63, and members 58 and 59 being removed from the two coils 29 and 34 under tension of the springs in response to opposite rotation of the rods 54 and 55.

In this particular embodiment, a pair of trimmer condensers 66 and a pair of inductance coils 67 are mounted within the recess 33 and are connected in circuit with the two ends extending from the transmitter coil 29 and with the twin-lead connector 122 for utilization in a novel circuit to be subsequently described. A third trimmer condenser 71 and associated inductance coil 72 are mounted within the other recess 39 of the block 1 and are electrically connected to the wire ends extending from the receiver coil and to the coaxial connector 72'.

A two-wire cord 73 extends through a small opening into the support tube 48 and through a small bore in the block 1 into the bore 12 where the ends of the cord wires are secured to the ends of the sweep coils 7 and 8 at junctions 73'.

In using this probe in gyromagnetic resonance systems, it is usually necessary to adjust the amount of inductive coupling between the transmitter and receiver coils. One particular method employed in detecting the resonance signal from the sample depends upon the presence of a leakage signal induced in the receiver coil from the transmitter, this system being referred to as the homodyning system of detection. The leakage signal may be in-phase with the transmitter field or out-of-phase. The coarse and fine balancing members 41 and 58 provide for coarse and fine adjustment of the in-phase leakage while the coarse and fine balancing members 42 and 59 provide for coarse and fine adjustments of the quadrature or out-of-phase leakage. The principle involved in the use of these balancing members for adjusting the in-phase and out-of-phase leakage is set out in the co-pending patent application of Forrest A. Nelson entitled "Decoupling Means for Electrical Circuits," Serial No. 303,353, filed August 8, 1952, now U.S. Patent No. 2,908,858, issued October 13, 1959. The structure in the present invention for utilizing this principle of balancing is an improvement over the apparatus set out in the above mentioned patent application. For example, a novel method for smoothly moving the fine adjusting members 58 and 59 relative to the transmitter coil 29 and receiver coil 34 is used which employs the spring members 62 and 63 and the threaded rods 54 and 55. The spring members maintain the rods 56 and 57 firmly in connection with the ends of the rods 54 and 55 and, regardless of any unsteady or jerky rotation of the rods 54 and 55 or slight backlash in the threads, the members 58 and 59 will move smoothly and steadily while adjusting.

Figure 8:
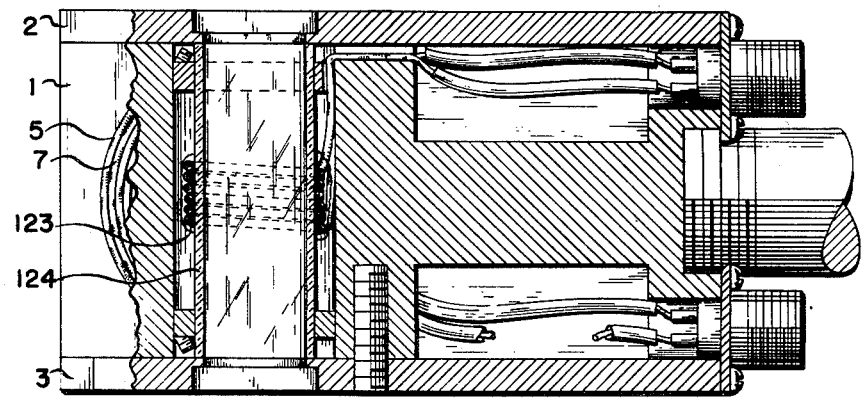
Fig. 8 is another novel probe structure embodying this invention which is adapted for use where only a single coil is desired.
Figure 12:
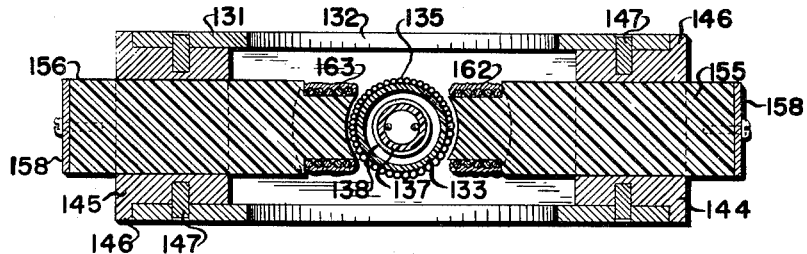
Fig. 12 is a transverse sectional view of the novel probe structure shown in Fig. 10 taken along section line 12—12 looking in the direction of the arrows.

Referring to Figs. 8 and 9 there is shown in two views a probe structure which is similar to the probe structure described above but differs therefrom in that the removable subassembly comprises only one coil of wire 123 and only one hollow cylindrical coil mounting tube 124. The coil may be mounted within or without the coil form 124. This particular probe structure is for use in the single-coil or absorption method of utilizing gyromagnetic resonance practiced in the known art. Since there is only one coil in the subassembly, the coarse-tuning and fine-tuning controls disclosed in the above described probe have been eliminated from the probe. Essentially, the parts of this probe are assembled in much the same manner as the probe described above and similar elements bear like reference numerals.

Figure 13:
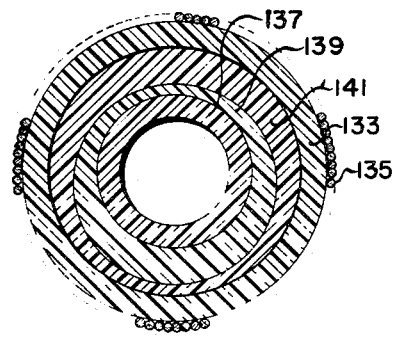
Fig. 13 is a section view of a portion of the novel probe of Fig. 10 taken along section line 13—13.

Referring now to Figs. 10, 11, 12 and 13, inclusive, there is shown another novel probe structure which permits relative movement of the transmitter and receiver coils in several directions to permit proper flux leakage balance thereof. For example, this balancing results in the field produced by the transmitter coil being orthogonal to the receiver coil field over the principal region of the cavity, thus producing a balance over a wide band of operating frequencies. In this particular embodiment, the body of the probe comprises a hollow rectangular member or case 131 which, for example, may be made from a section of brass wave guide. Circular openings 132 are located in the sides of the body 131 to facilitate inspection of the apparatus within the body. Extending vertically within the body and fixedly mounted in opposite sides thereof is a cylindrical tube or shield form 133 as of plastic which tapers to a smaller hollow cylindrical portion 134 at the lower end thereof. Fixedly secured on this shield form are a plurality of individually insulated shielding wires 135 as of enameled copper. The lower ends of the wires have the insulation removed therefrom and are electrically connected to a pair of grounding rings 136, which may be of brass, fixedly secured within the body. Located within the shield form is a receiver coil form 137 as of plastic having a receiver coil 138 wound about and secured on the outside surface thereof. Fixedly secured about the outside surface of one end of the coil form 137 is an adjusting ring 139 as of plastic. The outside surface of the ring is eccentric as seen in Fig. 13. This ring 139 is snugly but rotatably mounted within a second adjusting ring 141 having an eccentric inner surface, this second ring being snugly but rotatably mounted within the body and one end of the shield form 133. The opposite end of the coil form 137 is tapered and pivotally mounted in the restricted end of the shield form 133. The ends of the receiver coil 138 extend through openings in the ends of the receiver coil form 137 and shield form 133 into a housing 142 where one end of the receiver coil is grounded and the other end is connected to an output terminal 143. A pair of substantially rectangular mounting blocks 144 and 145 are mounted within the body 131, one in either open end thereof, each block having flanged edges or lips 146 on either side thereof engaging the outer edge of the ends of the body 131. Dowel pins 147 protrude from each side of each block and fit in slots 148 in the sides of the body for preventing horizontal movement of the blocks in the body. The blocks 144 and 145 may be moved vertically within the body by means of the adjusting screws 149 and 151 which may be rotated by the knurled knobs 152 and 153 securely affixed to the screws as by set screws 154. Slidably mounted in holes through the blocks 144 and 145 are a pair of rectangular transmitter coil forms 155 and 156 as of plastic. Fixedly secured on the outer ends of the transmitter coil forms by screws 157 are small plates 158 each having a bore therethrough. Adjusting screws 159 and 161 extend through the bores in the plates and are threaded into the blocks 144 and 145. The inner end surfaces of transmitter coil forms 155 and 156 are concave to conform to the cylindrical outer surface of the shield form 133, the inner ends of the transmitter coil forms also having slightly reduced rectangular dimensions. Two transmitter coil sections 162 and 163 are securely mounted as by plastic gluing on the inner ends of the coil forms 155 and 156 around the reduced portions thereof. The ends of the transmitter coil sections 162 and 163 are brought out from within the body through an opening therein into a protective housing 164, where the two sections of transmitter coil are connected in series at junction 165, one end of the coil 162—163 being grounded and the other end connected to an input terminal 166.

In operation, this probe may be electrically connected the same as described above for the probe in Fig. 2, the transmitter coil 162—163 being connected to a source of high frequency energy and the receiver coil 138 being connected to an electrical system for receiving the high frequency energy picked up by the receiver coil due to the precessing nuclei. This novel probe provides means for causing relative movement in several distinct directions between the receiver coil 138 and the transmitter coil 162—163, while the probe is in use in a nuclear induction system, for example, to thereby permit adjusting of the flux leakage balance between the two coils. The receiver coil 138 may be rotated in either direction about its axis, to the extent allowed by the slack coil ends, by rotation of the two adjusting rings 139 and 141 in unison and attached coil form 137 within the shield form. The receiver coil form 137 may also be moved in a manner whereby the axis of the receiver coil form will define the surface of a cone, the apex of the cone being located at the tapered or lower end of the coil form, by rotating one of the adjusting rings while maintaining the other fixed. The actual path that the axis of the coil form 137 will trace during relative rotational movements of the two adjusting rings may be greatly varied by various movements of the adjusting rings relative to each other and to the body 131. Each section 162 and 163 of the transmitter coil may be moved relative to the receiver coil 138 and independently of the other section. Each section may be moved in a direction parallel to the axis of the receiver coil 138 by rotation of the adjusting knobs 152 or 153 and also may be moved perpendicular to such axis by rotation of the adjusting screws 159 and 161. Combined rotation of both adjusting screws associated with either block will give an angular displacement of the corresponding transmitter coil section with respect to the receiver coil.

Referring now to Fig. 14 there is shown still another embodiment of this invention. The subassembly in this new probe comprises one coil form 167 in which the receiver coil 168 is mounted and on the outer surface of which the small individually insulated shielding wires 169 are secured. The two sections of transmitter coil 171 and 172 are secured on the inner ends of the two transmitter coil forms 173 and 174, the inner end surfaces of these coil forms being concave in shape to conform to the receiver coil form 167. These two transmitter coil forms 173 and 174 are movably mounted within the probe body in such manner that rotation of the adjusting screws 175 and 175' will move the transmitter coil sections away from and closer to the receiver coil while rotation of the other adjusting screws 176 will move the associated transmitter coil section in the direction parallel to the axis of the receiver coil. This probe includes the novel fine flux leakage adjusting members which operate much the same as described in the above mentioned probe. Because of the relative movements between the transmitter and receiver coils, it is possible to eliminate the coarse tuning members from this probe.

In addition to moving the transmitter sections 171 and 172 in directions perpendicular to the axis of the receiver coil 168 by simultaneous and equal rotation of the adjusting screws 175 or screws 175', the transmitter coil sections may be skewed relative to the axis. For example, by rotating the upper screw 175 more than the lower screw 175, the upper end of coil section 172 is removed further from the coil form 167 than the lower end. This is a decided advantage in balancing the flux leakage. This same skewing could be accomplished by using only one adjusting screw 175 or 175' per transmitter coil section, preferably centrally positioned, and by placing small shims between the upper or lower ends of the transmitter coil forms 174 or 173 and the receiver coil form 167. The subassembly is mounted within the body by means of mounting rings 167' and associated set screws 168'. The mounting rings may be slightly smaller in outer diameter than the openings in the body into which the subassembly is mounted and the set screws may be then utilized to adjust the position of the coil form and the coil within the probe. In this respect, the axis of the coil form may be skewed relative to the axis of the openings in the probe body and the transmitter coil.

It should be understood that the probe structures described above may be of various sizes and may take shapes other than those illustrated. For instance, in certain systems, an effective sample volume may be of the order of 3 cc. while in other systems an effective sample size would be .4 cc. From this divergence in sample sizes, it can be seen that the probe sizes vary accordingly.

Since many changes could be made in the above construction of this invention and many apparently widely different embodiments of this invention could be made without departing from the scope thereof, it is intended that all matter contained in the above description or shown in the accompanying drawings shall be interpreted as illustrative and not in a limiting sense.

What is claimed is:

1. A probe structure for use in positioning gyromagnetic matter in a polarizing magnetic field comprising a main body member having a cylindrical bore extending therein, a first hollow cylindrical dielectric tube mounted in axial alignment within said bore, a transmitter coil secured on the outer surface of said first tube, a second hollow cylindrical dielectric tube mounted in axial alignment within said first tube, and a receiver coil secured to the inner surface of said second tube in such manner that the axis of said receiver coil is substantially normal to the axis of said transmitter coil.

2. A probe structure as claimed in claim 1 including an electrostatic shield between said receiver and transmitter coils comprising a plurality of insulated wires secured between the first and the second dielectric tubes.

3. A probe structure for positioning gyromagnetic matter in a polarizing magnetic field comprising a body having a cavity therein, a transmitter coil and a receiver coil secured within said cavity and positioned with the axis of said receiver coil normal to the axis of said transmitter coil, flux leakage control means for controlling the flux linkage of said transmitter and receiver coils comprising an impedance element mounted in said body and extending into said cavity adjacent to said coils, means coupled to said impedance element for moving said element to thereby vary the spacing between said element and said coils, and resilient means coupled to said moving means for urging said means in one movable direction.

4. A probe structure for positioning gyromagnetic material in a unidirectional magnetic field comprising a body portion, a first coil form mounted within said body portion, a transmitter coil mounted on said coil form, a second coil form mounted within said body portion, a receiver coil mounted on said second coil form with its axis substantially normal to the axis of said transmitter coil, and means for causing adjustable relative movement between said first and second coil forms to thereby balance said transmitter and receiver coils.

5. A probe structure for positioning gyromagnetic material in a unidirectional magnetic field comprising a body portion, a first coil form mounted within said body portion, a transmitter coil mounted on said coil form, a second coil form mounted within said body portion, a receiver coil mounted on said second coil form with its axis substantially normal to the axis of said transmitter coil, first adjusting means for causing relative movement between said first and second coil forms so that the direction of movement is normal to the axis of said receiver coil, and second adjusting means for causing relative movement between said first and second coil forms so that the direction of the latter movement is parallel to the axis of said receiver coil.

6. A probe structure for positioning gyromagnetic material in a unidirectional magnetic field comprising a body portion, a hollow cylindrical coil form mounted therein, a receiver coil secured thereon in axial alignment therewith, a first transmitter coil form and a second transmitter coil form mounted in said body, a first section of a transmitter coil mounted on said first transmitter coil form and a second section of transmitter coil mounted on said second transmitter coil form, the transmitter coil forms being mounted in said body so that the two transmitter coil sections are substantially axially aligned, their axes being normal to the axis of said receiver coil, means for adjustably moving said first transmitter coil form with respect to said receiver coil and said second transmitter coil form, and means for adjustably moving said second transmitter coil form with respect to said receiver coil and said first transmitter coil form.

7. A probe structure for use in a gyromagnetic system comprising a main body portion having a cylindrical shaped cavity therein, a first hollow cylindrical dielectric coil form, a transmitter coil secured on the outer surface of said first coil form, a second hollow cylindrical dielectric coil form adapted to be inserted within said first coil form, a receiver coil secured on said second coil form such that its axis is substantially normal to the axis of said transmitter coil when said second coil form is within said first coil form, and a pair of mounting rings encircling and fixedly secured to said first coil form at its ends, said mounting rings serving to secure the first coil form within the body cavity.

8. A probe structure as claimed in claim 7 including electrostatic shielding wires secured on the inside surface of said first coil form so as to electrostatically shield said receiver coil from said transmitter coil.

9. A probe structure as claimed in claim 7 including a sweep coil mounted on said body, the axis of said sweep coil being substantially normal to the axes of both said transmitter and receiver coils.

10. A probe structure for use in a gyromagnetic resonance system comprising a main body portion having a cylindrical shaped cavity therein, a first hollow cylindrical dielectric coil form, a transmitter coil secured on the outer surface of said first coil form, said transmitter coil being made up in two halves, each half of said transmitter coil being positioned on opposite sides of the first coil form with the axis of said transmitter coil perpendicular to the axis of the cylindrical coil form, a second hollow cylindrical dielectric coil form adapted to be inserted within said first coil form, and a receiver coil secured on said second coil form such that its axis is aligned with the axis of said second coil form whereby the axis of said receiver coil is substantially normal to the axis of said transmitter coil when said second coil form is within said first coil form.

11. A probe structure as claimed in claim 10 including a sweep coil fixedly secured in a recess in the outer surface of said main body portion such that the axis of said sweep coil is substantially normal to the axes of both said transmitter coil and said receiver coil.

12. A probe structure for positioning gyromagnetic matter in a polarizing magnetic field for gyromagnetic resonance applications comprising a main body portion having a cavity therein, a transmitter coil and a receiver coil secured within the cavity and positioned with the axis of said receiver coil normal to the axis of said transmitter coil, flux leakage control means for controlling the flux linkage of said transmitter and receiver coils comprising a first pair of impedance elements movably mounted in said body and extending into said cavity adjacent to said coils whereby independent movement of said pair of impedance elements relative to said coils coarsely controls the flux linkage thereof and a second pair of impedance elements mounted in said body and extending into said cavity, screw means coupled to each of said second pair of impedance elements for independently moving said elements with relation to said transmitter and receiver coils to thereby further finely control the flux linkage between said transmitter and receiver coils, and spring means for urging each of said second pair of elements against said screw means for producing smooth movement of said fine control elements.

13. A probe structure as claimed in claim 12 wherein each of said first pair of impedance elements includes an associated screw member, the screw members being adapted to be threaded into the body member, said screw action serving to move the first impedance elements with relation to the receiver and transmitter coils.

14. A probe structure for positioning gyromagnetic matter in a polarizing magnetic field comprising a main body having a cavity therein, a first coil form mounted within said cavity, a transmitter coil mounted on said first coil form, a second coil form mounted within said cavity, a receiver coil mounted on said second coil form with its axis substantially normal to the axis of said transmitter coil, means for moving said transmitter coil form relative to said receiver coil form such that the transmitter coil axis moves in a direction parallel to the axis of said receiver coil, and means for rotating said receiver coil form such that said receiver coil rotates about its axis.

15. A probe structure as claimed in claim 14 wherein said means for rotating said receiver coil form includes means for rotating the form in an eccentric orbit relative to the coil axis.

16. A probe structure for positioning gyromagnetic matter in a polarizing magnetic field for gyromagnetic resonance applications comprising a main body portion having a cylindrical bore therein, a transmitter coil and a receiver coil secured within the cavity and positioned with the axis of said receiver coil normal to the axis of said transmitter coil, flux linkage control means for controlling the flux linkage of said transmitter and receiver coils comprising a first impedance element movably mounted in said body and extending into said cavity adjacent to said coils whereby the controlled movement of said impedance element relative to said coils controls the flux linkage thereof and a second impedance element mounted in said body and extending into said cavity, said second impedance element being relatively smaller than said first impedance element for utilization as a fine control for further controlling the flux linkage between said transmitter and receiver coils in combination with the coarse control first impedance element, said second impedance element being coupled to a rod threaded into said body, rotation of said threaded rod moving said second element, and spring means tensioned so as to maintain said second impedance element in pressure contact with said screw rod.

17. A probe structure for positioning gyromagnetic matter in a polarizing magnetic field comprising a main body having a cavity therein, a first coil form mounted within said cavity, said coil form being made up in two independent sections, a transmitter coil mounted on said first coil form, said transmitter coil being made up in two sections, each section of said transmitter coil being mounted on a separate one of said transmitter coil form sections, a receiver coil form mounted within said cavity, a receiver coil mounted on said receiver coil form with its axis substantially normal to the axis of said transmitter coil, means for moving each of said transmitter coil form sections independently relative to said receiver coil form such that the transmitter coil axis of the transmitter halves move in a direction parallel to the axis of said receiver coil, and means for rotating said receiver coil form such that said receiver coil rotates about its axis.

18. A probe structure for use in a gyromagnetic resonance system comprising a main body portion having a cavity therein, a first hollow cylindrical dielectric coil form adapted to be mounted in said cavity, a transmitter coil secured on the outer surface of said first coil form, said transmitter coil being made up in two halves, each half of said transmitter coil being positioned on opposite sides of the first coil form with the axis of said transmitter coil perpendicular to the axis of the cylindrical coil form, a second hollow cylindrical dielectric coil form adapted to be inserted in substantially axial alignment within said first coil form, a receiver coil secured on said second coil form such that its axis is aligned with the axis of said second coil form whereby the axis of said receiver coil is substantially normal to the axis of said transmitter coil when said second coil form is within said first coil form, and an electrostatic shield secured between said transmitter and receiver coils.

19. A probe structure as claimed in claim 18 wherein said electrostatic shield between said receiver and transmitter coils comprises a plurality of insulated wires secured on the inner surface and extending parallel to the axis of said first dielectric coil form.

20. A probe structure as claimed in claim 18 including flux leakage control means mounted in said probe and extending adjacent said first coil form for controlling flux linkage between said transmitter and receiver coils.

References Cited in the file of this patent

UNITED STATES PATENTS

| | | |
|---|---|---|
| 2,255,730 | Frazier | Sept. 9, 1941 |
| 2,439,827 | Sterenbuch et al. | Apr. 20, 1948 |
| 2,589,494 | Hershberger | Mar. 18, 1952 |
| 2,647,239 | Tellegen | July 28, 1953 |
| 2,756,383 | Nold et al. | July 24, 1956 |

OTHER REFERENCES

"A Proton-Controlled Magnetic Field Regulator," by Martin E. Packard, in The Review of Scientific Instruments, vol. 19, No. 7, July 1948, pages 435–439.

Proctor: Physical Review, vol. 79, No. 1, July 1, 1950, pp. 35–44.

Weaver: Physical Review, vol. 89, No. 5, March 1, 1953, pp. 923–930.